United States Patent [19]
Shinoda et al.

[11] Patent Number: 5,840,263
[45] Date of Patent: Nov. 24, 1998

[54] FLUE GAS TREATING PROCESS AND SYSTEM

[75] Inventors: Takeo Shinoda; Tamotsu Higuchi; Shinichiro Kotake; Kiyoshi Okazoe; Tatsuto Nagayasu; Koichiro Iwashita; Kenichiro Kawamichi, all of Tokyo; Susumu Okino; Toru Takashina, both of Hiroshima-ken, all of Japan

[73] Assignee: Mitsubishi Heavy Industries, Ltd., Tokyo, Japan

[21] Appl. No.: 848,838

[22] Filed: May 5, 1997

[30] Foreign Application Priority Data

May 30, 1996 [JP] Japan ................................. 8-136455
Jun. 20, 1996 [JP] Japan ................................. 8-159704

[51] Int. Cl.$^6$ ......................................... B01D 53/34
[52] U.S. Cl. ........................... 423/243.01; 423/242.1; 423/555; 422/169; 422/170; 422/224; 422/225; 422/234
[58] Field of Search ......................... 422/168–171, 422/224, 225, 234; 55/228, 229, 247; 423/243.01, 243.05, 243.06, 243.08, 242.1, 555.1, 215.5, DIG. 5

[56] References Cited

U.S. PATENT DOCUMENTS 5,405,433 4/1995 Rogers .......................... 55/228

FOREIGN PATENT DOCUMENTS

| 59-53828 | 4/1984 | Japan . |
|---|---|---|
| 59-38010 | 9/1984 | Japan . |
| 6-327927 | 11/1994 | Japan . |
| 7-116457 | 5/1995 | Japan . |
| 8-0019726 | 1/1996 | Japan . |

Primary Examiner—Hien Tran
Attorney, Agent, or Firm—Foley & Lardner

[57] ABSTRACT

A flue gas treating system for removing sulfur dioxide and dust present in flue gas by gas-liquid contact with an absorbing fluid and has an inlet side absorption tower of the liquid column type and an outlet side absorption tower of the liquid column type, each of which has a uniform cross-section over the area of gas-liquid contact, and the cross-section of flue gas in the inlet side absorption tower is smaller than the cross section of flue gas in the outlet side absorption tower. The inlet side absorption tower is constructed in the form of a parallel-flow absorption tower wherein the flue gas flows downward for favorable collection of dust and absorption of sulfur dioxide. The outlet side absorption tower is constructed in the form of a counter-flow adsorption tower wherein the flue gas flows upward for favorable absorption of sulfur dioxide. The absorbing fluid within a tank is injected upward from a plurality of spray pipes.

14 Claims, 4 Drawing Sheets

FLUE GAS TREATING PROCESS AND SYSTEM

BACKGROUND OF THE INVENTION

1. Field of the Invention

This invention relates to a gas-liquid contact apparatus which can bring a gas into efficient contact with a liquid without causing a substantial pressure loss, and a flue gas treating system which uses such a gas-liquid contact apparatus and can thereby achieve the desulfurization and other treatments of flue gas efficiently with small-sized equipment construction and at low cost.

This invention also relates to a flue gas treating process and system in which the desulfurization and dedusting of flue gas can be efficiently achieved with small-sized equipment construction and at low cost.

2. Description of the Related Art

Conventionally, there have been known such flue gas treating processes or systems using an absorption tower (or gas-liquid contact tower) of the packed tower type or an absorption tower of the spray tower or liquid column type. In these absorption towers, sulfur dioxides (typically sulfur dioxide) and dust (such as fly ash) present in flue gas are removed by bringing the flue gas into gas-liquid contact with an absorbing fluid having an absorbent (e.g., limestone) suspended therein.

Among them, an absorption tower of the packed tower type is a so-called gas-liquid contact apparatus of the wetted wall type, so that the absorption tower itself has low dedusting capability. Even when an absorption tower of the simple spray tower type is used, it has been difficult to achieve high-performance desulfurization and, at the same time, obtain high dedusting capability by effectively inducing collision dedusting which will be described later. Consequently, when an absorption tower of the packed tower or simple spray tower type is used, it has been common practice to install a gas-liquid contact section for dedusting use (comprising, for example, a Venturi scrubber) upstream of the absorption tower. Thus, it has been difficult to meet a recently growing demand for a reduction in size and cost while securing high performance.

It is also known that, as the gas-liquid contact apparatus included in a flue gas treating system for use, for example, in the desulfurization and dedusting of flue gas, an absorption tower of the so-called liquid-column type can be used in place of an absorption tower (or contact treatment tower) of the packed tower type requiring troublesome maintenance of the packing material. This absorption tower of the liquid column type brings flue gas into efficient contact with an absorbing fluid having an absorbent (e.g., limestone) suspended therein (i.e., an absorbent slurry), thus making it possible to remove sulfur oxides (typically sulfur dioxide) and dust (such as fly ash) present in the flue gas.

Flue gas treating systems using an absorption tower of the liquid column type are attracting attention, because the absorption tower itself has higher desulfurization and dedusting capabilities than absorption towers of the packed tower and like types, and high-performance desulfurization and dedusting can be achieved with small-sized equipment construction and at low cost.

Conventional flue gas treating systems of the liquid column type are disclosed, for example, in Japanese Utility Model Provisional Publication (JP-A) No. 59-53828/'84 and Japanese Patent Provisional Publication (JP-A) No. 6-327927/'94, and conventional flue gas treating systems of the spray tower type are disclosed, for example, in Japanese Patent Publication (JP-B) No. 59-38010/'84, Japanese Patent Provisional Publication (JP-A) No. 7-116457/'95 and Japanese Patent Provisional Publication (JP-A) No. 8-19726/'96.

However, both in conventional flue gas treating systems of the packed tower type and in conventional flue gas treating systems of the spray tower or liquid column type, their basic construction is such that one gas-liquid contact tower is installed for one absorbing fluid tank. Even when a separate gas-liquid contact tower for dedusting use is installed, a separate circulating fluid tank is used therefor. Thus, there has been a limit in attempts to achieve higher desulfurization and dedusting capabilities, reduce the size and cost, and improve maintainability.

Specifically, in order to achieve higher capabilities, it is basically required to increase the number of stages of the spray nozzles in the spray tower type, the liquid column height in the liquid column type, or the height of the packed region in the packed tower type. Moreover, in the packed tower type and the spray tower type, a separate gas-liquid contact section for dedusting use and a circulating fluid tank therefor must be installed as described previously. Consequently, the overall size of the equipment (in particular, the height of the absorption tower and the floor space for the tanks) and the number and height of the ducts and pipes connected thereto are markedly increased. In addition, the capacity and power consumption of the pumps for raising the absorbing fluid are also increased considerably.

Moreover, since the entrained mist present in the treated flue gas discharged from the absorption tower contains a relatively high concentration of sulfites, the mist eliminator used to recover the entrained mist tends to be clogged, thus posing a problem from the viewpoint of maintainability. Furthermore, in the case of a single-tower system (which does not have a gas-liquid contact tower for dedusting use), the flow velocity of the flue gas must be increased in order to induce collision dedusting (which will be described later) efficiently and thereby achieve high desulfurization and dedusting capabilities in the single absorption tower. In such a case, the amount of the aforesaid entrained mist (containing a relatively high concentration of sulfites) is extremely increased, so that a particularly large-sized mist eliminator needs to be installed and very troublesome maintenance operations (e.g., frequent cleaning operations for preventing its clogging) are required.

Even when a dedusting gas-liquid contact section of the Venturi scrubber type is installed as in the apparatus disclosed, for example, in Japanese Patent Publication (JP-B) No. 59-38010/'84, a tank for the circulating fluid fed to this dedusting gas-liquid contact section (i.e., the cooling tower or first absorption tower) is installed separately from the tank for the absorbing fluid fed to the main absorption tower (i.e., the second absorption tower), and the aforesaid circulating fluid (containing little unreacted limestone) has much lower desulfurization power than the absorbing fluid fed to the main absorption tower. Consequently, most of the burden of flue gas desulfurization is cast on the main absorption tower, and the mist discharged from the main absorption tower as a result of entrainment by the flue gas contains a relatively high concentration of sulfites. Thus, the aforesaid mist eliminator is liable to clogging. Moreover, the size of the main absorption tower (in particular, its height) must be increased in order to obtain high desulfurization capability.

The dedusting gas-liquid contact section of the Venturi scrubber type is designed so that the flow velocity of flue gas is markedly increased (to about 50–100 m/s) in a constricted region called a throat and this high flow velocity is utilized to divide the supplied circulating fluid into fine droplets and thereby secure a considerable degree of dedusting capability. Thus, as can be seen from the drawings of the aforementioned patent, this tower has a non-uniform, complicated cross-sectional shape. Although a considerably high degree of dedusting can be achieved, the manufacturing cost of this tower is markedly increased.

Accordingly, in Japanese Patent Application No. 5-118171/'93 (Japanese Patent Provisional Publication (JP-A) No. 6-327927/'94) and the like, the present applicant has proposed an apparatus which can achieve an improvement in performance and a reduction in size beyond the limits of the prior art.

This apparatus comprises a tank for storing an absorbing fluid, and two absorption towers of the liquid column type (i.e., parallel-flow and counterflow absorption towers) which are juxtaposed above the tank. In this apparatus, flue gas is successively introduced into these absorption towers, where the flue gas is brought into gas-liquid contact with the absorbing fluid within the aforesaid single tank. This apparatus not only affords a reduction in overall size (chiefly in the height of the absorption towers) and in costs (both in equipment cost and in operating cost), but also achieves high desulfurization and dedusting capabilities. Moreover, this apparatus reduces the sulfite concentration in the entrained mist and thereby brings about an improvement in the maintainability of the mist eliminator.

However, in order to achieve desulfurization and dedusting more efficiently with small-sized equipment construction and at low cost, even the above-described apparatus disclosed by the present applicant in Japanese Patent Provisional Publication (JP-A) No. 6-327927/'94 and the like involve the following problems to be solved.

(1) The apparatus disclosed in the aforementioned Japanese Patent Provisional Publication (JP-A) No. 6-327927/'94 is constructed so that both desulfurization and dedusting are performed in each absorption tower so as to attain a predetermined performance goal. That is, the burdens of desulfurization and dedusting are simply divided between two absorption tower having an almost equal size. Accordingly, each absorption tower is required to achieve the allotted degree of both desulfurization and dedusting.

Essentially, the gas-liquid contact conditions favorable for dedusting are not always the same as those favorable for desulfurization. Specifically, first of all, the lowest required feed rate of the absorbing fluid (or the smallest required liquid column height) usually differs between dedusting and desulfurization. However, this feed rate or the like must be set at the higher level. Moreover, in order to perform efficient dedusting in a small-sized space while maintaining the feed rate of the absorbing fluid or the like at a low level, it is important to utilize the so-called collision dedusting phenomenon in which dust is collected on the basis of the collision of dust particles with fine droplets of the absorbing fluid. In order to induce this collision dedusting effectively, it is necessary to increase the flow velocity of the flue gas and hence the energy of collision.

Meanwhile, in order to perform efficient desulfurization in a small-sized absorption tower having a smaller height, it is necessary to increase the gas-liquid contact area by increasing the cross-sectional area of the flow path for flue gas so that the flue gas will have a relatively low flow velocity. Especially in a counterflow absorption tower where the flue gas ascends countercurrently to the absorbing fluid falling under the action of gravity, an increase in the mist entrained by the flue gas poses a problem. In order to inhibit such an increase in the entrained mist and thereby achieve a high degree of desulfurization efficiently, the flow velocity must be set at a low value which does not permit useful dedusting capability to be expected.

For these reasons, in the above-described apparatus in which is intended to achieve a desired degree of desulfurization and dedusting in a plurality of simply divided gas-liquid contact towers, it has been impossible to optimize the setting and control of various conditions such as the flow velocity of flue gas, the dimensions of the gas-liquid contact region, and the feed rate (or circulation rate) of the absorbing fluid. That is, if preference is given to efficient dedusting, the resulting conditions will be wasteful for purposes of desulfurization, and if preference is given to efficient desulfurization, the resulting conditions will be inefficient for purpose of dedusting. Moreover, in the construction in which dedusting and desulfurization are performed in a counterflow absorption tower having a high flow velocity chosen with consideration for dedusting efficiency, the amount of mist entrained by the flue gas is markedly increased. This is disadvantageous in that a particularly large-sized mist eliminator is required to achieve a desired degree of desulfurization and dedusting while recovering such entrained mist.

(2) For similar reasons, it has been impossible to achieve both desulfurization and dedusting in response to variations in the concentrations of dust and sulfur dioxide in flue gas. For example, the sulfur dioxide concentration in flue gas discharged from a coal-fired boiler usually varies in the range of about 200 to 1,000 ppm. Accordingly, when only the efficiency of desulfurization is taken into consideration, it is preferable to alter the feed rate of the absorbing fluid in proportion to such variations in sulfur dioxide concentration. However, this manipulation is not always possible because of the need to achieve a desired degree of dedusting. As a result, it may happen that an excessive amount of the absorbing fluid is injected with the consumption of extra pumping power.

The basic construction of the conventional flue gas treating system of the liquid column type as described in the aforementioned patent publication and the like is such that a plurality of spray pipes having a plurality of nozzles formed in the longitudinal direction thereof are disposed in parallel within an absorption tower through which flue gas flows, and an absorbing fluid is injected upward from the nozzles of the spray pipes in the form of liquid columns to bring the flue gas (or gas) into contact with the absorbing fluid (or liquid). The aforesaid spray pipes are arranged in line on the same plane.

Consequently, even if an attempt is made to increase the distribution density of spray pipes by reducing the spacings between them, there is a limit from the viewpoint of operating cost. That is, if the spacings between spray pipes are simply reduced in order to increase the distribution density thereof, an increase in resistance to the flow of flue gas results as a matter of course. This causes an increase in the pressure loss of flue gas required for passage through the tower, resulting in an significantly increased operating cost.

In the prior art, therefore, it has been difficult to improve the degree of desulfurization unless the liquid column height is increased or the size of the absorption tower is increased by enlarging the horizontal dimensions thereof. Conversely speaking, there has conventionally been a limit in attempts to achieve a reduction in tower size and operating cost while maintaining a desired degree of desulfurization.

SUMMARY OF THE INVENTION

The present invention has been made with consideration for the above-described circumstances, and an object thereof is to provide a flue gas treating process and system which enables the desulfurization and dedusting of flue gas to be more efficiently achieved with small-sized equipment construction and at low cost.

A first aspect of the present invention relates to a flue gas treating process for removing at least sulfur dioxide and dust present in flue gas by gas-liquid contact with an absorbing fluid, which comprises using a gas-liquid contact apparatus comprising a tank to which the absorbing fluid is fed, an inlet side absorption tower of uniform cross-sectional shape which extends upward from one lateral part of the tank and in which the absorbing fluid within the tank is injected upward from a plurality of horizontally spaced positions in the form of liquid columns so as to bring untreated flue gas into gas-liquid contact with the absorbing fluid, and an outlet side absorption tower of uniform cross-sectional shape which extends upward from another lateral part of the tank and in which the absorbing fluid within the tank is injected upward from a plurality of horizontally spaced positions in the form of liquid columns so as to bring the flue gas leaving the inlet side absorption tower into gas-liquid contact with the absorbing fluid again; constructing one of the inlet side absorption tower and the outlet side absorption tower in the form of a parallel-flow absorption tower in which the flue gas flows downward, and setting the flow velocity of the flue gas in this parallel-flow absorption tower at a high value favorable for the collection of dust and the absorption of sulfur dioxide, while constructing the other of the inlet side absorption tower and the outlet side absorption tower in the form of a counterflow absorption tower in which the flue gas flows upward, and setting the flow velocity of the flue gas in this counterflow absorption tower at a low value favorable for the absorption of sulfur dioxide by counterflow gas-liquid contact; and controlling the feed rate of the absorbing fluid to the one parallel-flow absorption tower so that the dust concentration in the treated flue gas will have a desired value, and controlling the feed rate of the absorbing fluid to the other counterflow absorption tower so that at least the sulfur dioxide concentration in the treated flue gas will have a desired value.

A second aspect of the present invention relates to a flue gas treating system for removing at least sulfur dioxide and dust present in flue gas by gas-liquid contact with an absorbing fluid, wherein the flue gas treating system include a gas-liquid contact apparatus comprising a tank to which the absorbing fluid is fed, an inlet side absorption tower of uniform cross-sectional shape which extends upward from one lateral part of the tank and in which the absorbing fluid within the tank is injected upward from a plurality of horizontally spaced positions in the form of liquid columns so as to bring untreated flue gas into gas-liquid contact with the absorbing fluid, and an outlet side absorption tower of uniform cross-sectional shape which extends upward from another lateral part of the tank and in which the absorbing fluid within the tank is injected upward from a plurality of horizontally spaced positions in the form of liquid columns so as to bring the flue gas leaving the inlet side absorption tower into gas-liquid contact with the absorbing fluid again; one of the inlet side absorption tower and the outlet side absorption tower is constructed in the form of a parallel-flow absorption tower in which the flue gas flows downward, and the other of the inlet side absorption tower and the outlet side absorption tower is constructed in the form of a counterflow absorption tower in which the flue gas flows upward; and the cross-sectional area of the flow path in the one parallel-flow absorption tower is determined to be smaller than that in the other counterflow absorption tower so that the flue gas will have a high flow velocity favorable for the collection of dust and the absorption of sulfur dioxide, and the cross-sectional area of the flow path in the other counterflow absorption tower is determined to be larger than that in the one parallel-flow absorption tower so that the flue gas will have a low flow velocity favorable for the absorption of sulfur dioxide by counterflow gas-liquid contact. Moreover, such a flue gas treating system wherein the ratio of the cross-sectional area of the flow path in the counterflow absorption tower to the cross-sectional area of the flow path in the parallel-flow absorption tower is in the range of 1.5 to 3.5.

In the flue gas treating process or flue gas treating system of the present invention, the flow velocity of the flue gas in the parallel-flow absorption tower constituting one of the inlet side and outlet side absorption towers is set at a relatively high value favorable for dedusting and desulfurization, and the flow velocity of the flue gas in the counterflow absorption tower constituting the other of the inlet side and outlet side absorption towers is set at a relatively low value favorable for desulfurization by counterflow gas-liquid contact. Thus, dedusting is efficiently performed primarily in the aforesaid one parallel-flow absorption tower, at a lower feed rate of the absorbing fluid and in a small-sized space, while desulfurization is efficiently performed primarily in the aforesaid other counterflow absorption tower, also at a lower feed rate of the absorbing fluid and in a small-sized space (particularly at a small tower height).

Moreover, in the aforesaid one absorption tower, a considerable degree of desulfurization is consequently achieved together with dedusting, so that the burden of desulfurization in the aforesaid other absorption tower is significantly reduced. Conversely, in the aforesaid other absorption tower, some degree of dedusting is consequently achieved together with desulfurization, so that the burden of dedusting in the aforesaid one absorption tower is reduced. From this point of view, the feed rate of the absorbing fluid to each absorption tower and the size of the gas-liquid contact section (in particular, the space in the direction of the tower height) can also be reduced.

Furthermore, the feed rate of the absorbing fluid to the aforesaid one parallel-flow absorption tower is dominant over other operating variables which affect the overall dedusting capability, and the feed rate of the absorbing fluid to the aforesaid other counterflow absorption tower is dominant over other operating variables which affect the overall desulfurization capability.

Consequently, when the flue gas treating process of the present invention in which the feed rate of the absorbing fluid to the aforesaid one absorption tower is controlled so as to give a desired dust concentration in the treated flue gas and the feed rate of the absorbing fluid to the aforesaid other absorption tower is controlled so as to give at least a desired sulfur dioxide concentration in the treated flue gas is carried out, the desired degree of dedusting and desulfurization can be achieved with the least necessary overall pumping power by controlling the feed rates of the absorbing fluid to the respective absorption towers separately, even if the sulfur dioxide and dust concentrations in the untreated flue gas vary during operation.

For example, when only the sulfur dioxide concentration in the untreated flue gas has decreased, the feed rate of the absorbing fluid to the aforesaid other absorption tower is reduced to minimize the pumping power in response to the variation in sulfur dioxide concentration while maintaining the sulfur dioxide concentration in the treated flue gas at a desired value. On the other hand, the necessary feed rate of the absorbing fluid to the aforesaid one absorption tower is secured, so that the dust concentration in the treated flue gas can be easily maintained at a desired value.

Thus, the present invention can overcome the disadvantage that, although a decrease of the sulfur dioxide concentration in the untreated flue gas would make it possible to reduce the feed rate of the absorbing fluid and thereby save a considerable amount of pumping power from the viewpoint of desulfurization, the feed rate of the absorbing fluid cannot be sufficiently reduced because of the need to maintain the dedusting capability, and the disadvantage that, although a decrease of the dust concentration in the untreated flue gas would make it possible to reduce the feed rate of the absorbing fluid and thereby save a considerable amount of pumping power from the viewpoint of dedusting, the feed rate of the absorbing fluid cannot be sufficiently reduced because of the need to maintain the desulfurization capability. Consequently, it becomes possible to continue the operation with the least necessary overall pumping power while always maintaining the desired degree of desulfurization and dedusting.

For this reason, even when compared with the apparatus (comprising a simple dual-tower apparatus) disclosed by the present applicant in Japanese Patent Provisional Publication (JP-A) No. 6-327927/'94, a reduction in equipment size (particularly in tower height) and in, equipment cost can be achieved on the whole, and a cutdown in operating cost can also be achieved owing to the optimization of the pumping power.

Moreover, in the flue gas treating process of the present invention, only the feed rate of the absorbing fluid to the one absorption tower is controlled with respect to the overall dedusting capability, and only the feed rate of the absorbing fluid to the other absorption tower is controlled with respect to the overall desulfurization capability. Owing to such simple manipulations, the present invention also has the effect of making manual operation and automatically controlled operation much easier.

Furthermore, in the present invention, the absorption tower intended especially to perform a high degree of dedusting and desulfurization is constructed in the form of a parallel-flow absorption tower, and the cross-sectional area of the flow path in this parallel-flow absorption tower is made smaller to produce a high flow velocity of the flue gas. On the other hand, the flow velocity of the flue gas in the counterflow absorption tower is low. Thus, the mist discharged as a result of entrainment by the flue gas can be markedly decreased and, therefore, an increase in the capacity of the mist eliminator can be avoided. In addition, since a considerable amount of sulfur dioxide has already been removed in the inlet side absorption tower, the flue gas introduced into the outlet side absorption tower has a low sulfur dioxide concentration and, therefore, the mist entrained by the treated flue gas has an extremely low sulfite concentration. This makes the mist eliminator less liable to clogging and hence facilitates its maintenance operations greatly.

It is another object of the present invention to provide a gas-liquid contact apparatus which allows spray nozzles to be densely disposed while avoiding an increase in the pressure loss of the tower and which can bring about an improvement in gas-liquid contact efficiency without causing an increase in operating cost, as well as a flue gas treating system which uses such a gas-liquid contact apparatus and can thereby achieve the desulfurization and other treatments of flue gas efficiently with small-sized equipment construction and at low cost.

In order to accomplish the above object, the present invention provides a gas-liquid contact apparatus wherein a plurality of spray pipes are disposed in parallel within a contact treatment tower through which a gas flows, each of the spray pipes having a plurality of nozzles formed in the longitudinal direction of the spray pipe for injecting a liquid upward in the form of liquid columns to bring the gas into contact with the liquid, the spray pipes being arranged so that any adjacent spray pipes are located at positions differing in the direction of flow of the gas.

Thus, by disposing spray pipes at positions differing in the direction of flow of the gas, the degree of obstruction of the flow path of the gas is reduced and an increase in flow resistance is substantially checked, even if a large number of spray pipes are disposed. Moreover, even when the spray pipes are disposed at different vertical positions, the liquid columns injected upward from the spray pipes are allowed to have a sufficient height. Consequently, the gas-liquid contact efficiency can be improved in the original small-sized space, i.e., without increasing the height of the gas-liquid contact tower.

In the gas-liquid contact apparatus of the present invention, it is preferable that the spray pipes are alternately disposed at two different vertical positions.

When flue gas is used as the gas and an absorbing fluid having absorbent (such as limestone) suspended therein is used as the liquid in the above-described gas-liquid contact apparatus, there can be constructed a flue gas treating system suitable for the purpose of efficiently removing at least sulfur dioxide from flue gas by absorption into the absorbing fluid.

In the gas-liquid contact apparatus of the present invention or the flue gas treating system using this apparatus, the spray pipes are arranged so that any adjacent spray pipes are located at positions differing in the direction of flow of the flue gas. This makes it possible to increase the distribution density of the spray pipes and thereby improve the gas-liquid contact efficiency, without increasing the flow resistance of the gas or flue gas. Thus, it becomes possible to achieve an improvement in desulfurization capability and a reduction in equipment size (particularly in the liquid column height) while maintaining the operating cost on the same level as in the prior art.

In other words, the present invention makes it possible to decrease the flow resistance of the flue gas and the feed rate of the absorbing fluid and thereby reduce the operating cost while maintaining the gas-liquid contact efficiency (or the degree of desulfurization) on the same level as in the prior art.

Furthermore, the gas-liquid contact apparatus of the present invention in which the spray pipes are alternately disposed at two different vertical positions is particularly advantageous from the viewpoint of a reduction in equipment size, because this arrangement of the spray pipes does not require a substantial increase in the height of the contact treatment tower or absorption tower.

DETAILED DESCRIPTION OF PREFERRED EMBODIMENTS

Several embodiments of the present invention will be described hereinbelow with reference to the accompanying drawings.

(First embodiment)

Figure 1:
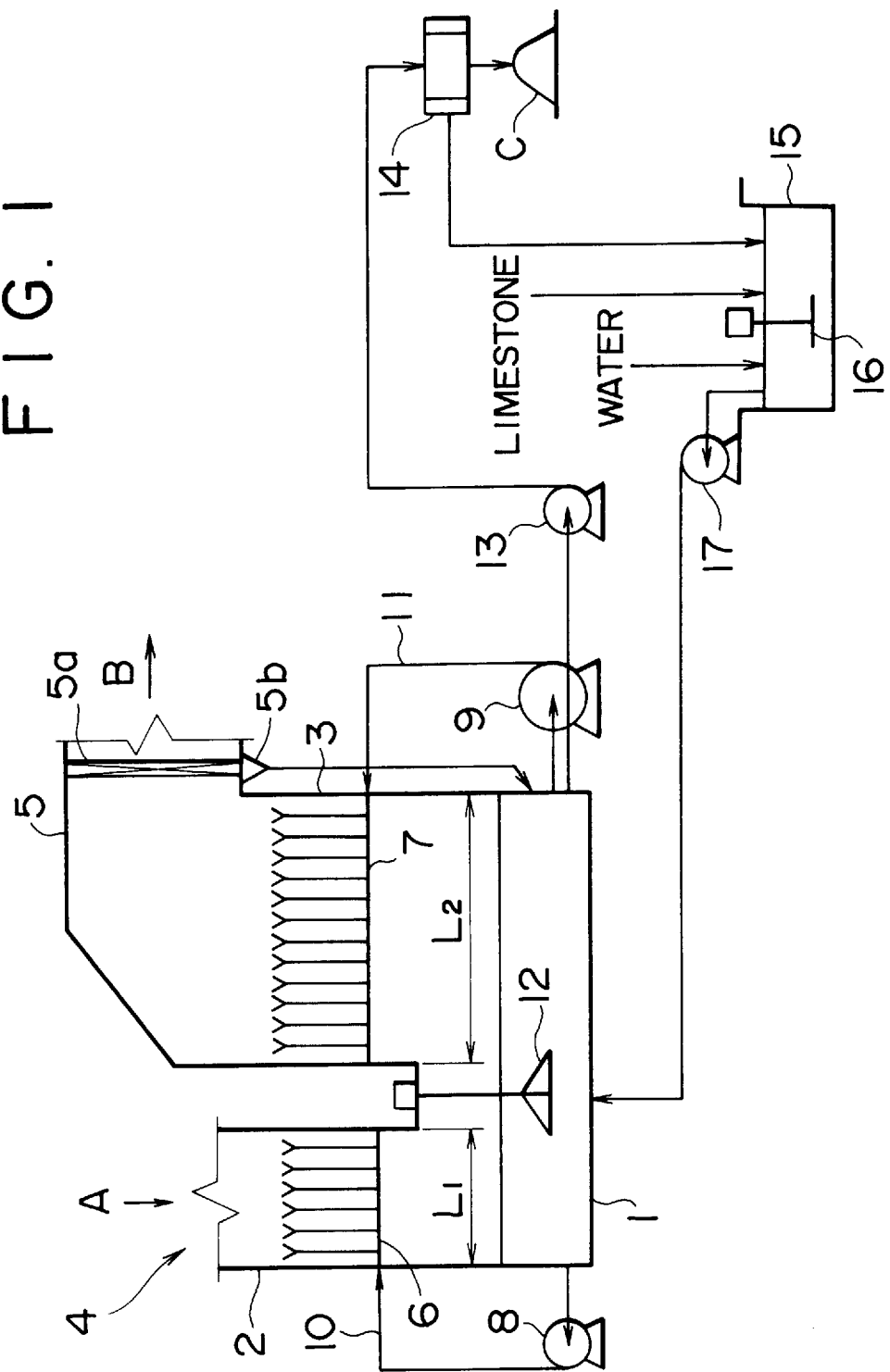
FIG. 1 illustrates the construction of an essential part of a flue gas treating system in accordance with a first embodiment of the present invention.

First of all, a flue gas treating system in accordance with a first embodiment of the present invention is described with reference to FIG. 1. FIG. 1 illustrates the construction of an essential part of this flue gas treating system.

This flue gas treating system includes a gas-liquid contact apparatus 4 comprising a tank 1 to which an absorbing fluid having an absorbent (such as limestone) suspended therein (hereinafter referred to as the absorbent slurry) is fed, an inlet side absorption tower 2 (i.e., the one absorption tower) of the liquid column type which extends upward from one lateral part of tank 1 and serves to bring untreated flue gas A into gas-liquid contact with the absorbent slurry within tank 1, and an outlet side absorption tower 3 (i.e., the other absorption tower) of the liquid column type which extends upward from another lateral part of tank 1 and serves to bring the flue gas leaving inlet side absorption tower 2 into gas-liquid contact with the absorbent slurry again.

The aforesaid inlet side absorption tower 2 is a so-called parallel-flow absorption tower in which at least the flow path in its gas-liquid contact region has a uniform cross section and a flue gas inlet section (not shown) for introducing untreated flue gas A is formed at its upper end so as to cause the flue gas to flow downward. On the other hand, the aforesaid outlet side absorption tower 3 is a counterflow absorption tower in which at least the flow path in its gas-liquid contact region has a uniform cross section and a flue gas outlet section 5 for discharging treated flue gas B is formed at its upper end so as to cause the flue gas having passed through inlet side absorption tower 2 and the upper space of tank 1 to flow upward.

Moreover, the cross-sectional area of the flow path in inlet side absorption tower 2 is determined to be smaller than that in the other absorption tower 3 so that the flue gas will have a high flow velocity (of 8 to 12 m/sec) favorable for the collection of dust and the absorption of sulfur dioxide, and the cross-sectional area of the flow path in outlet side absorption tower 3 is determined to be larger than that in inlet side absorption tower 2 so that the flue gas will have a low flow velocity (of 4 to 6 m/sec) favorable for the absorption of sulfur dioxide by counterflow gas-liquid contact. For example, when flue gas (having a flow rate of 3,000,000 m³/h) from a 1,000 MW coal-fired boiler is to be treated, the depth is 21.4 m for both the inlet side and outlet side absorption towers, and the widths of inlet side and outlet side absorption towers (i.e., $L_1$ and $L_2$ as shown in FIG. 1) are 4.9 m and 10.4 m, respectively. In this case, the average flow velocity of the flue gas in inlet side absorption tower 2 is 10 m/s and the average flow velocity of the flue gas in outlet side absorption tower 3 is 4.5 m/s.

Moreover, in each of absorption towers 2 and 3, a plurality of spray pipes 6 or 7 are disposed in parallel. In these spray pipes 6 or 7, a plurality of nozzles (not shown) for injecting the absorbent slurry upward in the form of liquid columns are formed in the longitudinal direction thereof (i.e., in a lateral direction in FIG. 1). It is to be understood that a large number of spray pipes 6 or 7 and nozzles are provided at intervals of, for example, about 500 mm.

Furthermore, circulating pumps 8 and 9 for withdrawing and raising the absorbent slurry within tank 1 are installed on both sides of tank 1. Thus, the absorbent slurry is fed to spray pipes 6 and 7 through circulation lines 10 and 11, respectively, and injected upward from the nozzles thereof.

Furthermore, in this embodiment, a mist eliminator 5a for collecting and removing entrained mist is installed in the flue gas outlet section 5 of outlet side absorption tower 3. The mist collected by this mist eliminator 5a is accumulated in an underlying hopper 5b and returned to tank 1 through a drain pipe connected to the bottom of hopper 5b.

This gas-liquid contact apparatus is provided with a so-called rotating-arm air sparger 12 for blowing air for oxidizing use into the slurry within tank 1 in the form of fine air bubbles while stirring the slurry, so that the absorbent slurry having sulfur dioxide absorbed therein is brought into efficient contact with the air in tank 1 and thereby completely oxidized to form gypsum.

More specifically, in this gas-liquid contact apparatus, the absorbent slurry injected from spray pipes 6 (or 7) within absorption tower 2 (or 3) flows downward while absorbing sulfur dioxide and dust as a result of gas-liquid contact with flue gas, and enters tank 1 where it is oxidized by contact with a large number of air bubbles blown thereinto while being stirred with air sparger 12, and then undergoes a neutralization reaction to form gypsum. The predominant reactions occurring in the course of these treatments are represented by the following reaction formulas (1) to (3).

(Flue gas inlet section of absorption tower)

$$SO_2 + H_2O \rightarrow H^+ + HSO_3^- \qquad (1)$$

(Tank)

$$H^+ + HSO_3^- + \tfrac{1}{2}O_2 \rightarrow 2H^+ + SO_4^{2-} \qquad (2)$$

$$2H^+ + SO_4^{2-} + CaCO_3 + H_2O \rightarrow CaSO_4 \cdot 2H_2O + CO_2 \qquad (3)$$

Thus, gypsum, a small amount of limestone (used as absorbent) and dust are steadily suspended in the slurry within tank 1. In the illustrated embodiment, this slurry is withdrawn from tank 1 by means of a slurry pump 13 and fed to a solid-liquid separator 14. As a result of filtration, gypsum C having a low water content (usually of about 10%) is recovered. On the other hand, the filtrate from solid-liquid separator 14 is supplied to a slurry preparation tank 15 as water for the preparation of an absorbent slurry.

This slurry preparation tank 15 is equipped with a stirrer 16 and serves to prepare an absorbent slurry by mixing limestone (absorbent) introduced from a limestone silo (not shown) with water supplied from solid-liquid separator 14 and stirring this mixture. The absorbent slurry within slurry preparation tank 15 is fed to tank 1 by means of a slurry pump 17 as required.

During operation, the amount of water supplied to slurry preparation tank 15 is regulated, for example, by means of a controller (not shown) and a flow control valve (not shown). Moreover, by controlling the operation of, for example, a rotary valve (not shown), limestone is suitably supplied from the limestone silo in an amount corresponding to the amount of water supplied. Thus, slurry preparation tank 15 is maintained in such a state that an absorbent slurry having a predetermined concentration (for example, of about 20% by weight) is always stored therein at a level within certain limits.

Furthermore, in order to make up for the water gradually lost owing to evaporation in gas-liquid contact apparatus 4 or the like, make-up water (such as industrial water) is suitably supplied to slurry preparation tank 15.

During operation, in order to maintain the degree of desulfurization and the purity of gypsum at a high level, the sulfur dioxide concentration in untreated flue gas A and the pH and limestone concentration of the absorbent slurry within tank 1 and the like are detected with sensors. Thus, the feed rate of limestone to slurry preparation tank 15, the feed rate of the absorbent slurry to tank 1, and other parameters are suitably controlled by means of a controller (not shown).

Furthermore, a dry, electrostatic precipitator is usually installed upstream of gas-liquid contact apparatus 4 of the liquid column type. Thus, dust present in flue gas is preliminarily removed to some extent.

In the gas-liquid contact apparatus 4 of the above-described flue gas treating system, two absorption towers of the liquid column type are installed both on the inlet side and on the outlet side, so that efficient desulfurization and dedusting can be achieved with smaller-sized equipment construction and less power consumption than with a single-tower apparatus. Moreover, the absorption of dust, together with the absorption of sulfur dioxide, is efficiently performed in inlet side absorption tower 2 in which the cross-sectional area of the flow path is optimized especially for dedusting, and especially the absorption of sulfur dioxide is efficiently performed in outlet side absorption tower 3 in which the cross-sectional area of the flow path is optimized for desulfurization by counterflow gas-liquid contact, without causing an increase in the amount of entrained mist. Thus, high-performance desulfurization and dedusting can be achieved with smaller-sized equipment construction and at a lower operating cost than with the apparatus (comprising a simple dual-tower apparatus) disclosed by the present applicant in the aforementioned Japanese Patent Provisional Publication (JP-A) No. 6-327927/'94 and the like.

Specifically, the absorbent slurry within tank 1 is fed to spray pipes 6 and 7 through circulation lines 10 and 11 by means of circulating pumps 8 and 9, respectively. On the other hand, flue gas is first introduced into inlet side absorption tower 2 and flows downward.

The absorbent slurry fed to spray pipes 6 is injected upward from the nozzles of spray pipes 6. The spouted absorbent slurry scatters at its peak and then falls, so that the falling slurry and the spouted slurry collide with each other to produce fine droplets of the slurry. Moreover, the jets of the absorbent slurry spouted at a large number of positions form a large number of constricted flow paths of the flue gas in the spaces between adjacent streamlined outer peripheries of their peaks. Thus, on the whole, a large number of small-sized Venturi scrubbers arranged in parallel on a horizontal plane are formed in the absorption tower, so that the production of fine droplets of the slurry is further promoted by this multiple Venturi effect.

Thus, fine droplets of the slurry are produced successively. Since the flue gas containing sulfur dioxide flows downward through inlet side absorption tower 2 in which fine droplets of the slurry exist in a uniformly distributed state, the gas-liquid contact area per unit volume is increased. Moreover, since the flue gas is effectively dragged into the spouted streams of the slurry in the neighborhood of the nozzles, the slurry and the flue gas are effectively mixed, so that a considerable amount of sulfur dioxide is preliminarily removed in this inlet side absorption tower 2 of the parallel-flow type. For example, even if the circulation rate of the absorbent slurry and the liquid column height in this inlet side absorption tower 2 are set at lower values than those employed in conventional single-tower apparatus, sulfur dioxide can be absorbed and removed with a degree of desulfurization of about 60 to 80% (in the case of conventional single-tower apparatus, a degree of desulfurization of 90 to 95% is achieved in one tower).

Moreover, since the cross-sectional area of the flow path in inlet side absorption tower 2 is optimized especially for dedusting so that the flue gas will have a flow velocity favorable for dedusting, the previously described collision dedusting, together with so-called diffusion dedusting, is effectively performed. Thus, the desired degree of dedusting can be substantially achieved in this inlet side absorption tower 2 alone.

Subsequently, the flue gas having passed through inlet side absorption tower 2 flows laterally through the space above tank 1. Then, in this embodiment, it enters outlet side absorption tower 3 from the bottom and flows upward in this outlet side absorption tower 3. Also in this outlet side absorption tower 3, the absorbent slurry is injected upward from the nozzles of spray pipes 7. In the same manner as in inlet side absorption tower 2, the spouted absorbent slurry falls in the form of fine droplets and comes into contact with the countercurrently flowing flue gas. Moreover, since the flue gas is effectively dragged into the spouted streams of the slurry in the neighborhood of the nozzles, the slurry and the flue gas are effectively mixed. Thus, most of the remaining sulfur dioxide is removed in this outlet side absorption tower 3 of the counterflow type.

In this embodiment, a considerable amount of sulfur dioxide is removed in inlet side absorption tower 2, and the cross-sectional area of the flow path in outlet side absorption tower 3 is determined as described above so that the flue gas will have a flow velocity favorable for desulfurization by counterflow gas-liquid contact. Thus, as shown in the data which will be given later, sulfur dioxide is absorbed and removed with a final degree of desulfurization of 95% or greater by using a liquid column height of about 2–3 m and an absorbent slurry circulation rate of about 29,400 $m^3/h$.

Specifically, in the gas-liquid contact apparatus 4 of the above-described flue gas treating system, the flow velocity of the flue gas in inlet side absorption tower 2 is set at a relatively high value favorable for dedusting and desulfurization (especially for dedusting), and the flow velocity of the flue gas in outlet side absorption tower 3 is set at a relatively low value favorable for desulfurization by counterflow gas-liquid contact. Thus, dedusting is efficiently performed primarily in inlet side absorption tower 2, at a lower feed rate of the absorbent slurry (i.e., a lower circulation rate produced by circulating pump 8) and in a small-sized space. On the other hand, desulfurization is efficiently performed primarily in outlet side absorption tower 3, also at a lower feed rate of the absorbent slurry (i.e., a lower circulation rate produced by circulating pump 9) and in a small-sized space (particularly at a small tower height), and without causing an increase in the amount of entrained mist. Moreover, in inlet side absorption tower 2 located on the upstream side, a considerable degree of desulfurization is consequently achieved together with dedusting, so that the burden of desulfurization in outlet side absorption tower 3 is significantly reduced. Conversely, in outlet side absorption tower 3 located on the downstream side, some degree of dedusting is consequently achieved together with desulfurization, so that the burden of dedusting in inlet side absorption tower 2 is reduced. From this point of view, the circulation rates of the absorbent slurry in absorption towers 2 and 3 and the height of the liquid columns can also be reduced.

Furthermore, since the flow velocity of the flue gas in inlet side absorption tower 2 is set at a relatively high value favorable especially for dedusting and the flow velocity of the flue gas in outlet side absorption tower 3 is set at a relatively low value favorable for desulfurization by counterflow gas-liquid contact, the circulation rate of the absorbent slurry in inlet side absorption tower 2 is dominant over other operating variables which affect the overall dedusting capability, and the circulation rate of the absorbent slurry in outlet side absorption tower 3 is dominant over other operating variables which affect the overall desulfurization capability. Consequently, even if the sulfur dioxide and dust concentrations in the untreated flue gas vary during operation, the desired degree of dedusting and desulfurization can be achieved with the least necessary overall pumping power by controlling the circulation rates of the absorbent slurry in the respective absorption towers separately according to the flue gas treating process of the present invention which will be described later.

For example, when only the sulfur dioxide concentration in the untreated flue gas has decreased, the circulation rate of the absorbent slurry in outlet side absorption tower 3 is reduced to minimize the pumping power in response to the variation in sulfur dioxide concentration while maintaining the sulfur dioxide concentration in the treated flue gas at a desired value. On the other hand, the necessary circulation rate of the absorbent slurry in inlet side absorption tower 2 is secured, so that the dust concentration in the treated flue gas can be easily maintained at a desired value. Thus, it is possible to respond carefully to variations in the sulfur dioxide or dust concentration in the flue gas and thereby optimize the pumping power to a minimum necessary level while maintaining the lowest required degree of desulfurization and dedusting capabilities.

For this reason, even when compared with the apparatus (comprising a simple dual-tower apparatus) disclosed by the present applicant in Japanese Patent Provisional Publication (JP-A) No. 6-327927/'94, a reduction in equipment size (particularly in tower height) and in equipment cost can be achieved on the whole, and a cutdown in operating cost can also be achieved owing to the optimization of the pumping power.

Furthermore, in the gas-liquid contact apparatus 4 of the above-described flue gas treating system, inlet side absorption tower 2 of the parallel-flow type is used as the one absorption tower of the present invention which is intended especially to perform a high degree of dedusting and desulfurization, and the cross-sectional area of the flow path in this inlet side absorption tower 2 is made smaller to produce a high flow velocity of the flue gas. Thus, the mist discharged as a result of entrainment by the flue gas can be markedly decreased and, therefore, an increase in the capacity of the aforesaid mist eliminator can be avoided.

Specifically, if the cross-sectional area of the flow path in the outlet side absorption tower (or counterflow absorption tower) is made smaller to produce a high flow velocity also favorable for dedusting, the mist discharged as a result of entrainment by the flue gas will be markedly increased. If no countermeasure is taken, problems such as a reduction in dedusting and desulfurization capabilities will arise. Accordingly, the capacity of the aforesaid mist eliminator 5a must be increased to return such mist to the tank. In the above-described gas-liquid contact apparatus 4, however, the flow velocity of the flue gas in inlet side absorption tower (or parallel-flow absorption tower) 2 is made higher while the flow velocity of the flue gas in outlet side absorption tower (or counterflow absorption tower) 3 is made lower, and the flue gas is made to flow downward in inlet side absorption tower 2. Thus, most of the mist produced in inlet side absorption tower 2 falls into tank 1 before entering outlet side absorption tower 3. Moreover, in outlet side absorption tower 3, the amount of mist entrained by the flue gas decreases in response to the reduction in the flow velocity of the flue gas. Eventually, an increase of the mist discharged as a result of entrainment by the flue gas is avoided. Consequently, an increase in the capacity of the aforesaid mist eliminator 5a is prevented. From this point of view, a reduction in the size and cost of the equipment can be achieved.

In addition, since a considerable amount of sulfur dioxide has already been removed from the flue gas in inlet side absorption tower 2 before it is introduced into outlet side absorption tower 3, the mist finally discharged from outlet side absorption tower 3 as a result of entrainment by treated flue gas B has an extremely low sulfite concentration. This makes the mist eliminator less liable to clogging and hence facilitates its maintenance operations greatly.

In order to obtain a flow velocity suitable for the securement of sufficient dedusting capability in the parallel-flow absorption tower, the ratio of the cross-sectional area of the flow path in the counterflow absorption tower to the cross-sectional area of the flow path in the parallel-flow absorption tower should preferably be 1.5 or greater. On the other hand, in order to avoid an excessive slowdown of the flow velocity in the counterflow absorption tower while maintaining a suitable flow velocity in the parallel-flow absorption tower, the ratio should preferably be 3.5 or less. If the flow velocity in the counterflow absorption tower is excessively low, the size of the absorption tower must be greatly increased to maintain its capabilities.

Now, the flue gas treating process of the present invention which can be carried out in the above-described flue gas treating system will be described hereinbelow.

According to this process, in the above-described system construction, the flow velocity of the flue gas in inlet side absorption tower 2 is set at a relatively high value favorable for dedusting and desulfurization, and the flow velocity of the flue gas in outlet side absorption tower 3 is set at a relatively low value favorable for desulfurization by counterflow gas-liquid contact, as has been described previously. Moreover, the sulfur dioxide and dust concentrations in treated flue gas B are suitably or continuously detected during operation. Thus, the circulation rate of the absorbent slurry in inlet side absorption tower 2 is controlled so that the dust concentration in treated flue gas B will have a desired value, and the circulation rate of the absorbent slurry in outlet side absorption tower 3 is controlled so that the sulfur dioxide concentration in treated flue gas B will have a desired value.

For example, when the sulfur dioxide concentration in treated flue gas B has increased above the upper limit (e.g., 50 ppm) of the desired range, the circulation rate of the absorbent slurry in outlet side absorption tower 3 is increased, for example, in proportion to the increment in sulfur dioxide concentration. Thus, the so-called L/G (i.e., the ratio of the circulation rate to the flow rate of the flue gas) and the liquid column height in outlet side absorption tower 3 are increased to enlarge the gas-liquid contact area, whereby the increase of the sulfur dioxide concentration in treated flue gas B is inhibited. Conversely, when the sulfur dioxide concentration in treated flue gas B has decreased below the lower limit (e.g., 40 ppm) of the desired range, the circulation rate of the absorbent slurry in outlet side absorption tower 3 is decreased, for example, in proportion to the decrement in sulfur dioxide concentration. Thus, the so-called L/G (i.e., the ratio of the circulation rate to the flow rate of the flue gas) and the liquid column height in outlet side absorption tower 3 are decreased to reduce the gas-liquid contact area, whereby unnecessary pumping power is saved. In this manner, it is possible to maintain the pumping power at a minimum necessary level in response to variation in sulfur dioxide concentration while maintaining the sulfur dioxide concentration in treated flue gas B at a desired value (for example, of 40 to 50 ppm).

In this case, the dust concentration in the treated flue gas may vary slightly as a result of variation in the dedusting capability of outlet side absorption tower 3. Then, the dust concentration in the treated flue gas can be maintained at a desired value by fine adjustment of the circulation rate in inlet side absorption tower 2. However, since the gas-liquid contact in inlet side absorption tower 2 is dominant with respect to dedusting as described previously, adjustment of the circulation rate in inlet side absorption tower 2 is seldom required. If it is necessary, the degree of adjustment is very slight.

For example, when the dust concentration in treated flue gas B has increased above the upper limit (e.g., 5 mg/m$^3$N) of the desired range, the so-called L/G (i.e., the ratio of the feed rate of the absorbing fluid to the flow rate of the flue gas) and the liquid column height in inlet side absorption tower 2 are increased to enlarge the gas-liquid contact area, whereby the increase of the dust concentration in treated flue gas B is inhibited. Conversely, when the dust concentration in treated flue gas B has decreased below the lower limit (e.g., 4 mg/m$^3$N) of the desired range, the circulation rate of the absorbent slurry in inlet side absorption tower 2 is decreased, for example, in proportion to the decrement in dust concentration. Thus, the so-called L/G (i.e., the ratio of the feed rate of the absorbing fluid to the flow rate of the flue gas) and the liquid column height in inlet side absorption tower 2 are decreased to reduce the gas-liquid contact area, whereby unnecessary pumping power is saved. In this manner, it is possible to maintain the pumping power at a minimum necessary level in response to variation in the dust concentration in the untreated flue gas while maintaining the dust concentration in treated flue gas B at a desired value (for example, of 4 to 5 mg/m$^3$N).

In this case, the sulfur dioxide concentration in the treated flue gas may vary slightly as a result of variation in the desulfurization capability of inlet side absorption tower 2. Then, the sulfur dioxide concentration in the treated flue gas can be maintained at a desired value by fine adjustment of the circulation rate in outlet side absorption tower 3. However, since the gas-liquid contact in outlet side absorption tower 3 is dominant with respect to desulfurization as described previously, adjustment of the circulation rate in outlet side absorption tower 3 is seldom required. If it is necessary, the degree of adjustment is very slight.

Thus, this embodiment can overcome the disadvantage that, although a decrease of the sulfur dioxide concentration in the untreated flue gas would make it possible to reduce the circulation rate and thereby save a considerable amount of pumping power from the viewpoint of desulfurization, the circulation rate cannot be sufficiently reduced because of the need to maintain the dedusting capability, and the disadvantage that, although a decrease of the dust concentration in the untreated flue gas would make it possible to reduce the circulation rate and thereby save a considerable amount of pumping power from the viewpoint of dedusting, the circulation rate cannot be sufficiently reduced because of the need to maintain the desulfurization capability. Consequently, it becomes possible to continue the operation with the least necessary overall pumping power while always maintaining the desired degree of desulfurization and dedusting.

Moreover, only the circulation rate in inlet side absorption tower 2 is controlled with respect to the overall dedusting capability, and only the circulation rate in outlet side absorption tower 3 is controlled with respect to the overall desulfurization capability. Owing to such simple manipulations, this embodiment also has the effect of making manual operation and automatically controlled operation much easier.

The sulfur dioxide and dust concentrations in treated flue gas B may be continuously detected, for example, by providing flue gas outlet section 5 with sensors, or may be detected by manual analysis, for example, at regular intervals. Control of the aforesaid circulation rates on the basis of the detected values may be automatically performed, for example, by means of flow control valves installed in circulation lines 10 and 11 and a controller for controlling them, or may be manually performed by the operator.

(Second embodiment)

Figure 2:
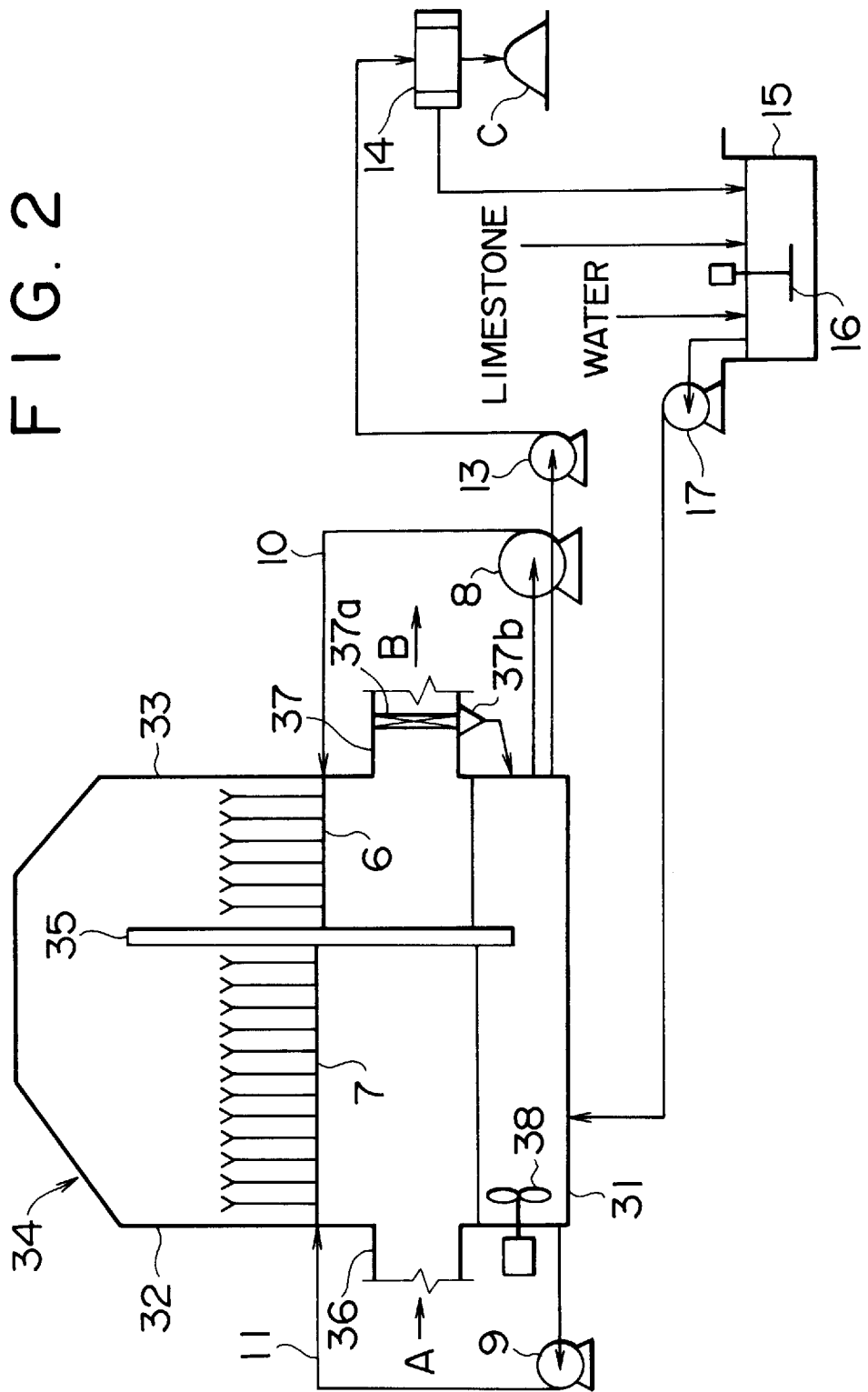
FIG. 2 illustrates the construction of an essential part of a flue gas treating system in accordance with a second embodiment of the present invention.

Now, a flue gas treating system in accordance with a second embodiment of the present invention is described below. FIG. 2 is a view illustrating the construction of an essential part of this flue gas treating system. In the following description, the same elements as mentioned above in connection with the first embodiment illustrated in FIG. 1 are designated by the same reference numerals, and the explanation thereof is omitted.

This flue gas treating system includes a gas-liquid contact apparatus 34 comprising a tank 31 to which an absorbent slurry is fed, an inlet side absorption tower 32 (i.e., the other absorption tower) of the liquid column type which extends upward from one lateral part of tank 31 and serves to bring untreated flue gas A into gas-liquid contact with the absorbent slurry within tank 31, and an outlet side absorption tower 33 (i.e., the one absorption tower) of the liquid column type which extends upward from another lateral part of tank 31 and serves to bring the flue gas leaving inlet side absorption tower 32 into gas-liquid contact with the absorbent slurry again.

In this embodiment, inlet side absorption tower 32 and outlet side absorption tower 33 have a flow path of uniform cross section at least in their gas-liquid contact regions, and are formed on both sides of a partition wall 35 disposed vertically so as to divide the space above tank 31. Inlet side absorption tower 32 is a so-called counterflow absorption tower in which a flue gas inlet section 36 for introducing untreated flue gas A is formed at its lower end so as to cause the flue gas to flow upward, and outlet side absorption tower 33 is a so-called parallel-flow absorption tower in which a flue gas outlet section 37 for discharging treated flue gas B is formed at its lower end so as to cause the flue gas having passed through inlet side absorption tower 32 and the connecting space above partition wall 35 to flow downward.

Similarly to the first embodiment, a mist eliminator 37*a* for collecting and removing entrained mist is installed in the flue gas outlet section 37 of outlet side absorption tower 33. The mist collected by this mist eliminator 37a is accumulated in an underlying hopper 37b and returned to tank 31 through a drain pipe connected to the bottom of hopper 37b.

Moreover, in this embodiment, the cross-sectional area of the flow path in outlet side absorption tower 33 is determined to be smaller than that in the other absorption tower so that the flue gas will have a high flow velocity favorable for dust collection and desulfurization, and the cross-sectional area of the flow path in inlet side absorption tower 32 is determined to be larger than that in outlet side absorption tower 33 so that the flue gas will have a low flow velocity favorable for the absorption of sulfur dioxide by counterflow gas-liquid contact.

In this embodiment, air for oxidizing use is supplied to tank 31 through an air supply pipe (not shown) or the like. While the slurry within tank 31 is stirred with a stirrer 38, the air for oxidizing use is divided into fine air bubbles. Thus, similarly to the first embodiment, the absorbent slurry having sulfur dioxide absorbed therein is brought into efficient contact with the air in tank 31 and thereby completely oxidized to form gypsum.

In the flue gas treating system of this second embodiment, the absorption of sulfur dioxide is performed primarily in inlet side absorption tower 32, and the collection of dust is performed primarily in outlet side absorption tower 33. Thus, similarly to the previously described first embodiment, the desired degree of desulfurization and dedusting can be achieved with smaller-sized equipment construction and with less pumping power, by carrying out the flue gas treating process of the present invention. Moreover, it is also possible to respond efficiently to variations in flue gas properties and thereby achieve a reduction in floor space and a cutdown in equipment cost and operating cost.

Furthermore, in the flue gas treating system of this second embodiment, flue gas inlet section 36 and flue gas outlet section 37 are disposed at the lower ends of the respective absorption towers. Consequently, this embodiment has a unique effect in that the height of ducts used for connection with them can be made considerably low and, therefore, the installation cost of these ducts can be significantly reduced.

(Demonstrative Data)

Now, in order to demonstrate the action and effects of the present invention, data obtained from calculations performed by the present inventors are described hereinbelow.

First of all, the specifications and performance of three apparatus (i), (ii) and (iii) under the same conditions are given below. Specifically, the apparatus (i) comprises a conventional parallel-flow absorption tower of the liquid column type (i.e., a single-tower apparatus as disclosed, for example, in the aforementioned Japanese Utility Model Provisional Publication (J-A) No. 59-53828/'84), the apparatus (ii) comprises a conventional parallel-flow/counterflow absorption tower of the liquid column type (i.e., a simple dual-tower apparatus as disclosed, for example, in the aforementioned Japanese Patent Provisional Publication (JP-A) No. 6-327927/'94), and the apparatus (iii) comprises a parallel-flow/counterflow absorption tower of the liquid column type in accordance with the present invention (i.e., the gas-liquid contact apparatus 4 of the above-described first embodiment).

(a) Conditions of calculation
  Flow rate of gas at the inlet: 3,000,000 m³N/h.
  Sulfur dioxide concentration at the inlet: 900 ppm.
  Dust concentration at the inlet: 30 mg/m³N.
  Sulfur dioxide concentration at the outlet (desired value): 36 ppm or less (with a degree of desulfurization of about 95% or greater).
  Dust concentration at the outlet (desired value): 5 mg/m³N or less.

(b) Specifications of apparatus
  Height of absorption tower:
    (i) 24 m.
    (ii) 18 m (inlet side), 17 m (outlet side).
    (iii) 18 m (inlet side), 18 m (outlet side).
  Liquid column height:
    (i) 10.6 m.
    (ii) 11.4 m (inlet side), 1.8 m (outlet side).
    (iii) 4.4 m (inlet side), 2.6 m (outlet side).
  Width of absorption tower:
    (i) 9.4 m.
    (ii) 9.5 m (inlet side), 10.4 m (outlet side).
    (iii) 4.7 m (inlet side), 10.4 m (outlet side).
  Depth of absorption tower:
    (i) 22.4 m.
    (ii) 21.4 m (inlet side), 21.4 m (outlet side).
    (iii) 21.4 m (inlet side), 21.4 m (outlet side).
  Dimensions of tank:
    (i) 21 m (width)×22.4 m (depth).
    (ii) 23.9 m (width)×21.4 m (depth).
    (iii) 19.3 m (width)×21.4 m (depth).
  Specifications of circulating pumps:
    (i) 9,300 m³/h×22 mH×6 pumps.
    (ii) 8,600 m³/h×15 mH×4 pumps (inlet side). 8,000 m³/h×13 mH×3 pumps (outlet side).
    (iii) 9,000 m³/h×15 mH×2 pumps (inlet side). 9,800 m³/h×13.6 mH×3 pumps (outlet side).

(c) Performance of apparatus
  Sulfur dioxide concentration at the outlet of absorption tower:
    (i) 36 ppm.
    (ii) 230 ppm (inlet side), 36 ppm (outlet side).
    (iii) 360 ppm (inlet side), 36 ppm (outlet side).
  Dust concentration at the outlet of absorption tower:
    (i) 4.4 mg/m³N.
    (ii) 6.6 mg/m³N (inlet side), 3.2 mg/m³N (outlet side).
    (iii) 4.0 mg/m³N (inlet side), 2.4 mg/m³N (outlet side).
  Pressure loss in absorption tower:
    (i) 93 mmH₂O.
    (ii) 106 mmH₂O.
    (iii) 143 mmH₂O.
  Circulation flow rate in absorption tower (during steady-state operation):
    (i) 56,000 m³/h.
    (ii) 34,200 m³/h (inlet side), 24,300 m³/h (outlet side).
    (iii) 18,000 m³/h (inlet side), 29,400 m³/h (outlet side).
  Relative power consumption (during steady-state operation):
    (i) 100%.
    (ii) 85%.
    (iii) 84%.
  Entrained mist concentration at the final outlet of absorption tower (just before mist eliminator):
    (i) 1–2 g/m³N.
    (ii) 100–200 g/m³N.
    (iii) 100–200 g/m³N.

When the sulfur dioxide concentration at the inlet has decreased from 900 ppm to 200 ppm during operation of the aforesaid apparatus (i), (ii) and (iii) under the above-described conditions (a), the employable operating conditions and the resulting performance of the apparatus are as follows.

(d) Operating conditions (when the sulfur dioxide concentration at the inlet has changed to 200 ppm)
  Circulation flow rate in absorption tower:
    (i) 56,000 m$^3$/h.
    (ii) 34,200 m$^3$/h (inlet side), 18,000 m$^3$/h (outlet side).
    (iii) 18,000 m$^3$/h (inlet side), 18,000 m$^3$/h (outlet side).
  Liquid column height in absorption tower:
    (i) 4.4 m.
    (ii) 4.4 m (inlet side), 1.0 m (outlet side).
    (iii) 4.4 m (inlet side), 1.0 m (outlet side).
(e) Performance of apparatus (when the sulfur dioxide concentration at the inlet has changed to 200 ppm)
  Sulfur dioxide concentration at the outlet of absorption tower:
    (i) 2 ppm.
    (ii) 30 ppm (inlet side), 30 ppm (outlet side).
    (iii) 55 ppm (inlet side), 11 ppm (outlet side).
  Dust concentration at the outlet of absorption tower:
    (i) 4.4 mg/m$^3$N.
    (ii) 6.6 mg/m$^3$N (inlet side), 3.7 mg/m$^3$N (outlet side).
    (iii) 4.0 mg/m$^3$N (inlet side), 2.9 mg/m$^3$N (outlet side).
  Pressure loss in absorption tower:
    (i) 50 mmH$_2$O.
    (ii) 57 mmH$_2$O.
    (iii) 102 mmH$_2$O.
  Relative power consumption (during steady-state operation):
    (i) 100%.
    (ii) 77%.
    (iii) 69%.
  Entrained mist concentration at the final outlet of absorption tower (just before mist eliminator):
    (i) 1–2 g/m$^3$N.
    (ii) 100–200 g/m$^3$N.
    (iii) 100–200 g/m$^3$N.

It can be seen from the foregoing calculated data that, of the three apparatus [specifically, the apparatus (i) comprising a conventional parallel-flow absorption tower of the liquid column type (i.e., a single-tower apparatus), the apparatus (ii) comprising a conventional parallel-flow/counterflow absorption tower of the liquid column type (i.e., a simple dual-tower apparatus), and the apparatus (iii) comprising a parallel-flow/counterflow absorption tower of the liquid column type in accordance with the present invention (i.e., the gas-liquid contact apparatus 4 of the above-described first embodiment)], the apparatus (iii) has the smallest size and exhibits the lowest power consumption in both cases. The apparatus (ii) and (iii) exhibit better maintainability because the mist produced in the apparatus (ii) and (iii) has a very low concentration of sulfites responsible for the clogging of the mist eliminator as compared with the mist produced in the apparatus (i). Moreover, since the amount of entrained mist depends primarily on the flow velocity of flue gas in the outlet side absorption tower, there is no change between the apparatus (ii) and (iii). That is, a marked increase in the amount of entrained mist is avoided in the apparatus (iii).

(Third embodiment)

Figure 3:
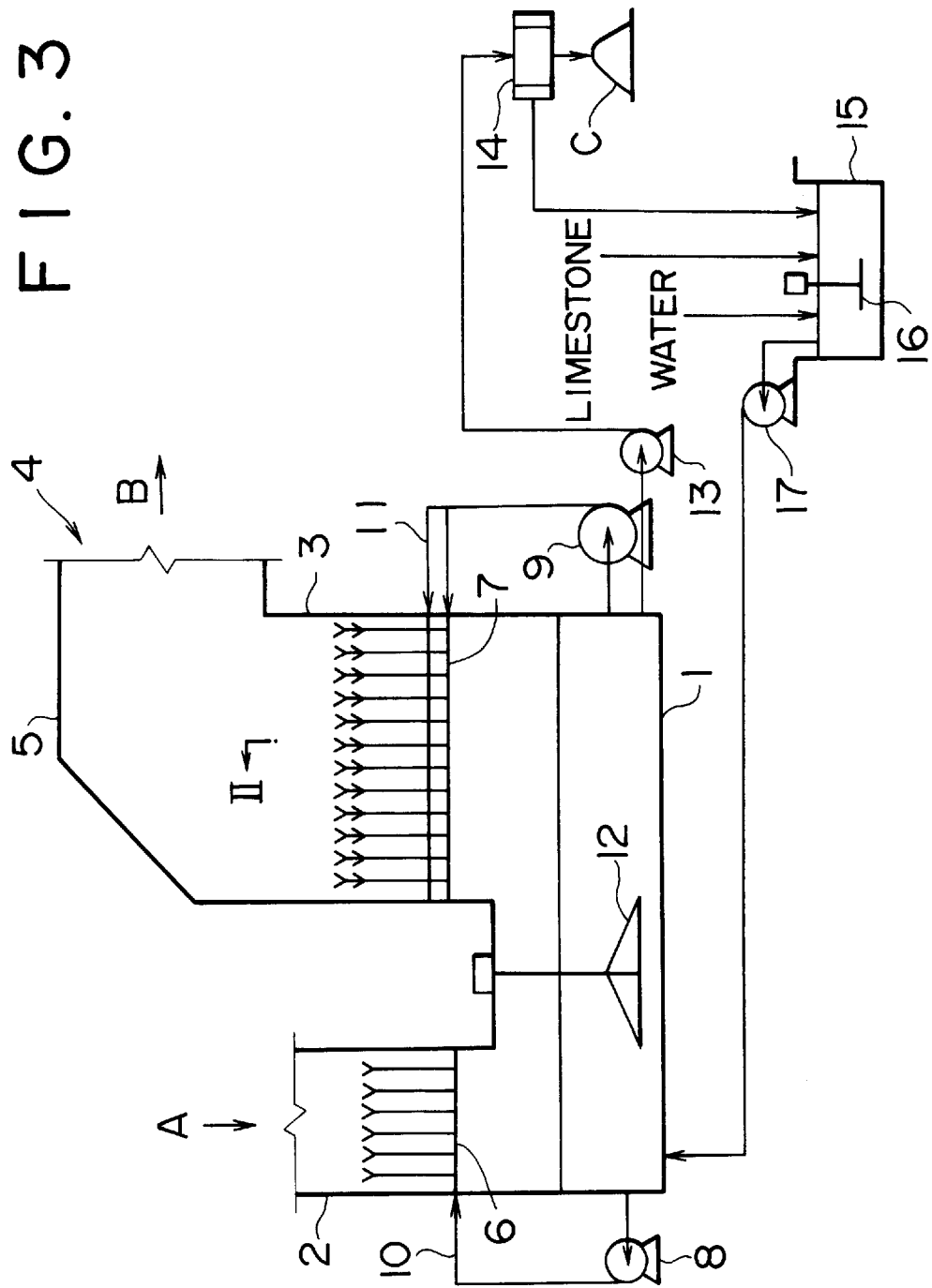
FIG. 3 illustrates the construction of an essential part of a flue gas treating system in accordance with a third embodiment of the present invention.
Figure 4:
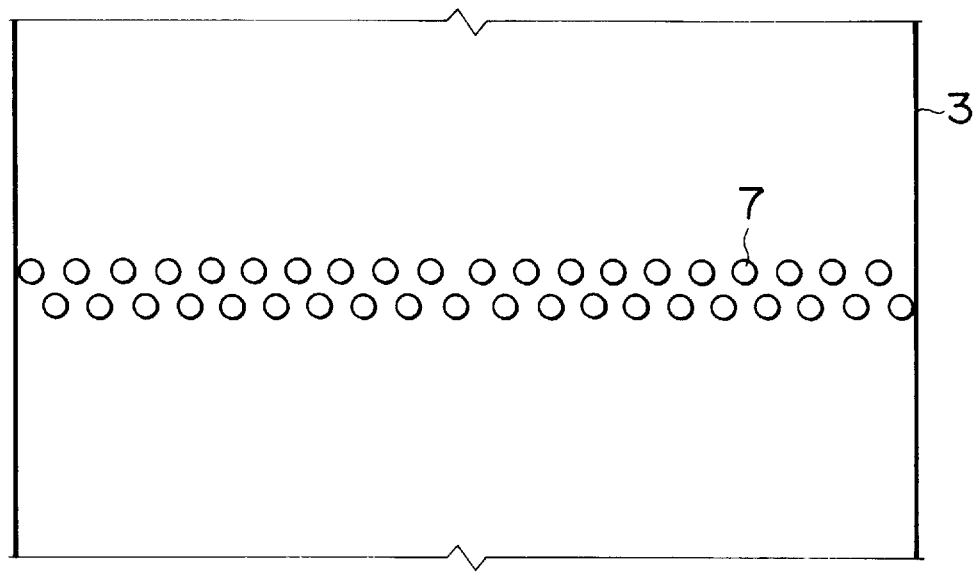
FIG. 4 is an enlarged sectional view taken along the line II of FIG. 3, showing the arrangement of spray pipes in the gas-liquid contact apparatus of the flue gas treating system illustrated in FIG. 3.
Figure 5:
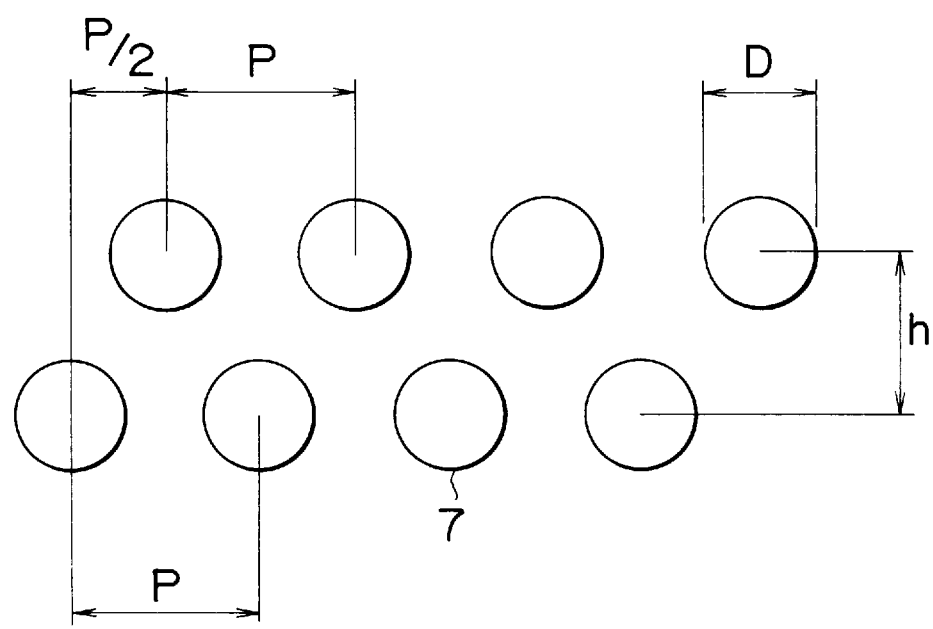
FIG. 5 is a view for explaining the arrangement of spray pipes in FIG. 4 more clearly.

FIG. 3 is a view illustrating the construction of an essential part of a flue gas treating system in accordance with this embodiment, and FIG. 4 is an enlarged sectional view taken along the line II of FIG. 3, showing the arrangement of spray pipes in the flue gas treating system of FIG. 3. FIG. 5 is a view for explaining the arrangement of spray pipes in FIG. 4 more clearly. In the following description, the same elements as mentioned above in connection with the first embodiment illustrated in FIG. 1 are designated by the same reference numerals, and the explanation thereof is omitted as much as possible.

In this embodiment, inlet side absorption tower 2 is a so-called parallel-flow absorption tower in which untreated flue gas A is introduced from its upper end and caused to flow downward. On the other hand, outlet side absorption tower 3 is a so-called counterflow absorption tower in which a flue gas outlet section 5 for discharging treated flue gas B is formed at its upper end so as to cause the flue gas having passed through inlet side absorption tower 2 and the upper space of tank 1 to flow upward.

Spray pipes 7 within outlet side absorption tower 3 are arranged so that any adjacent spray pipes 7 are located at positions differing in the direction of flow of the gas (in this case, a vertical direction). In this embodiment, spray pipes 7 are alternately disposed at two different vertical positions (i.e., in so-called staggered relationship) as illustrated in FIG. 4.

In the case of a common flue gas treating system for thermal electric power plants, the outer diameter D of spray pipes 7 is in the range of 200 to 300 mm. Moreover, the horizontal spacing (P/2) and vertical spacing (h) of spray pipes 7, as shown in FIG. 5, may be determined to be in the range of about 500 to 700 mm.

In any event, when spray pipes 7 are alternately disposed at two different vertical positions, the degree of obstruction of the flow path of the flue gas is markedly reduced and an increase in flow resistance is substantially checked, as compared with the case in which all spray pipes 7 are arranged on the same plane (with spacing P/2) as known in the prior art.

Moreover, since the liquid column height (i.e., the height to which the absorbent slurry is spouted from spray pipes 7) is usually several meters or greater, it is hardly necessary to increase the height of the absorption tower when spray pipes 7 are vertically shifted by the aforesaid vertical spacing h. In addition, no adverse influence is exerted on the desulfurization capability. Rather, as a result of an increase in the distribution density of spray nozzles (i.e., the distribution density of liquid columns), the gas-liquid contact efficiency (or desulfurization capability) can be markedly improved by using absorption tower 3 having the same small size as in the prior art.

In the gas-liquid contact apparatus 4 of the above-described flue gas treating system, spray pipes 7 are densely disposed without causing an increasing in flow resistance, as described above. Thus, the gas-liquid contact efficiency is improved owing to the increased distribution density of liquid columns. As a result, high desulfurization capability is achieved especially in outlet side absorption tower 3, without causing an increase in the size of outlet side absorption tower 3 or an increase in the pressure loss of the flue gas (i.e., the powder requirement of the flue gas feeding fan).

The absorbent slurry fed to spray pipes 6 is injected upward from the nozzles of spray pipes 6. The spouted absorbent slurry scatters at its peak and then falls, so that the falling slurry and the spouted slurry collide with each other to produce fine droplets of the slurry successively. Thus, fine droplets of the slurry come to exist in a state distributed almost uniformly throughout absorption tower 2.

Moreover, since the flue gas is effectively dragged into the spouted streams of the slurry in the neighborhood of the nozzles, the slurry and the flue gas are effectively mixed, so that a considerable amount of sulfur dioxide is preliminarily removed in this parallel-flow absorption tower 2. For example, even if the circulation rate of the absorbent slurry and the liquid column height in this parallel-flow absorption tower 2 are set at a lower level than in the prior art, sulfur dioxide can be absorbed and removed with a degree of desulfurization of about 60 to 80%.

Thus, in this embodiment, a considerable amount of sulfur dioxide is removed in parallel-flow absorption tower 2, and spray pipes 7 are densely disposed to increase the distribution density of liquid columns without causing an increasing in flow resistance, as described above. As a result, the gas-liquid contact area is markedly increased over the prior art, so that sulfur dioxide can finally be absorbed and removed with a degree of desulfurization far exceeding 95%.

Consequently, so long as the same degree of performance as in the prior art is desired in the above-described flue gas treating system using gas-liquid contact apparatus 4, the desired degree of desulfurization and dedusting can be efficiently achieved even if the pressure of the flue gas feeding fan, the circulation rate of the absorbent slurry as produced by circulating pump 9, or the liquid column height is decreased as compared with the prior art. Thus, it is possible to reduce the operating cost by minimizing the power consumption and, moreover, to reduce the size and cost of the equipment by decreasing the height and horizontal dimensions of absorption tower 3.

It is to be understood that the present invention is not limited to the above-described embodiments, but may also be practiced in various other ways. For example, the present invention can be applied to gas-liquid contact apparatus having two absorption towers as described above, but also to gas-liquid contact apparatus having one absorption tower.

Moreover, the manner of disposition of the spray pipes is not limited to the two-stage arrangement illustrated in FIGS. 3 to 5. For example, the spray pipes may be arranged at three stages, arranged obliquely so as to form an overall V-shaped pattern when viewed from the same direction as in FIG. 4, or arranged on one inclined plane. However, when they are arranged in multiple stages, the height of the absorption tower must be correspondingly increased to some extent. From this point of view, the above-described embodiment involving a two-stage arrangement is preferred.

We claim:

1. A flue gas treating process for removing at least sulfur dioxide and dust present in flue gas by gas-liquid contact with an absorbing fluid, which comprises:

feeding an absorbing fluid into a tank of a gas-liquid contact apparatus wherein said gas-liquid contact apparatus comprises an inlet side liquid column absorption tower extending upwardly from a lateral part of the tank and having a uniform cross section which encompasses a first area of gas-liquid contact and having a plurality of spray pipes, and further comprises an outlet side liquid column absorption tower extending upwardly from another lateral part of the tank and having a uniform cross section which encompasses a second area of gas-liquid contact and having a plurality of spray pipes, wherein the cross-section of said inlet side liquid column absorption tower is smaller than the cross section of said outlet side liquid column absorption tower;

flowing untreated flue gas in a downward direction into said inlet side absorption tower, at a flow velocity value favorable for the collection of dust and the absorption of sulfur dioxide, while spraying the absorbing fluid in an upward direction from said tank via the plurality of spray pipes of the inlet side absorption tower, at a feed rate value wherein dust concentration in the flue gas is reduced, thereby contacting the untreated flue gas with the absorbing fluid to reduce the dust concentration and sulfur dioxide concentration; and flowing the flue gas in an upward direction toward said outlet side absorption tower, at a flow velocity value favorable for the absorption of sulfur dioxide, while spraying the absorbing fluid in an upward direction from said tank via the plurality of spray pipes of the outlet side absorption tower, at a feed rate value wherein at least the sulfur dioxide concentration is reduced, thereby contacting the flue gas with the absorbing fluid to further reduce the dust concentration and sulfur dioxide concentration.

2. The process of claim 1, wherein the absorbing fluid is fed from a slurry preparation tank via a slurry pump.

3. The process of claim 2, wherein the slurry preparation tank includes a stirrer.

4. The process of claim 1, wherein said absorbing fluid within said tank is fed to said plurality of spray pipes through a circulation line by a circulating pump.

5. A flue gas treating system for removing at least sulfur dioxide and dust removal present in flue gas by gas-liquid contact with an absorbing fluid, comprising:

a tank into which absorbing fluid is fed;

an inlet side liquid column absorption tower extending upward from one lateral part of said tank and having a uniform cross-section which encompasses a first area of gas-liquid contact and in which the absorbing fluid within said tank is injected upward from a first plurality of spray pipes, and is constructed in the form of a parallel-flow absorption tower wherein the flue gas flows downward contacting the falling absorbing fluid for collection of dust and absorption of sulfur dioxide; and an outlet side liquid column absorption tower extending upward from another lateral part of said tank and having a uniform cross section which encompasses a second area of gas-liquid contact and in which the absorbing fluid within said tank is injected upward from a second plurality of spray pipes and is constructed in the form of a counter-flow adsorption tower wherein the flue gas flows upward contacting the falling absorbing fluid for absorption of sulfur dioxide, wherein the cross-section of said inlet side absorption tower is smaller than the cross-section of said outlet side absorption tower.

6. The system of claim 5, further comprising a mist eliminator operatively connected to the outlet side absorption tower.

7. The system of claim 5, wherein said first and second plurality of spray pipes each contain a plurality of nozzles.

8. The system of claim 5, wherein the ratio of said uniform cross-section in said outlet side absorption tower to said uniform cross-section in said inlet side absorption tower is in the range of 1.5 to 3.5.

9. The system of claim 5, wherein said first plurality of spray pipes are positioned in parallel within the inlet side absorption tower and said second plurality of spray pipes are positioned in parallel within the outlet side absorption tower.

10. The system of claim 7, wherein said first plurality of nozzles are formed along the longitudinal axis of the respective spray pipes.

11. The system of claim 5, wherein adjacent spray pipes in each of said first and second plurality of spray pipes are alternately disposed at two different vertical positions.

12. The system of claim 5, further comprising a slurry preparation tank and a slurry pump for feeding the absorbing fluid into the tank.

13. The system of claim 5, further comprising a circulation pump and a circulating line for feeding the absorbing fluid from the tank to the plurality of spray pipes.

14. The system of claim 12, wherein the slurry preparation tank includes a stirrer.

* * * * *